US009624861B2

(12) United States Patent
Weber et al.

(10) Patent No.: US 9,624,861 B2
(45) Date of Patent: Apr. 18, 2017

(54) METHOD FOR OPERATING AN INTERNAL COMBUSTION ENGINE

(71) Applicant: Bayerische Motoren Werke Aktiengesellschaft, Munich (DE)

(72) Inventors: Wolfgang Weber, Vierkirchen-Esterhofen (DE); Winfried Weuste, Oberhaching (DE); Stephan Wenzel, Munich (DE); Johannes Rieger, Graefelfing (DE); Florian Mehringer, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 158 days.

(21) Appl. No.: 14/612,354

(22) Filed: Feb. 3, 2015

(65) Prior Publication Data

US 2015/0219031 A1 Aug. 6, 2015

(30) Foreign Application Priority Data

Feb. 4, 2014 (DE) ........................ 10 2014 202 002

(51) Int. Cl.
*B60T 7/12* (2006.01)
*F02D 41/14* (2006.01)
(Continued)

(52) U.S. Cl.
CPC ..... *F02D 41/1439* (2013.01); *F02D 41/1458* (2013.01); *F02D 41/1486* (2013.01);
(Continued)

(58) Field of Classification Search
CPC . F02D 19/023; F02D 19/0607; F02D 19/0628
(Continued)

(56) References Cited

U.S. PATENT DOCUMENTS 5,038,635 A * 8/1991 Takizawa ................ F16H 59/14 477/131
6,003,491 A 12/1999 Kawasaki
(Continued)

FOREIGN PATENT DOCUMENTS

DE 101 15 736 A1 10/2001
DE 698 22 717 T2 8/2004
(Continued)

*Primary Examiner* — John Kwon
(74) *Attorney, Agent, or Firm* — Crowell & Moring LLP

(57) ABSTRACT

A mixture pilot control for operating an internal combustion engine, in particular a gasoline engine of a motor vehicle, is provided. The mixture pilot control determines at least one composition of an air-fuel mixture required for a predetermined target air-fuel mixture ratio. The internal combustion engine is also provided with a lambda control with at least one lambda probe arranged in the exhaust gas flow of the internal combustion engine for determining a deviation of the actual air-fuel ratio from the predetermined target air-fuel ratio. Operating-parameter-dependent correction factors for the composition of the air-fuel mixture by the mixture pilot control are determined in dependence on the lambda control deviation, at least one of the load and/or the rotational speed and/or the temperature of the internal combustion engine, and further operating parameters of the vehicle other than the load, rotation speed or temperature of the internal combustion engine.

9 Claims, 1 Drawing Sheet

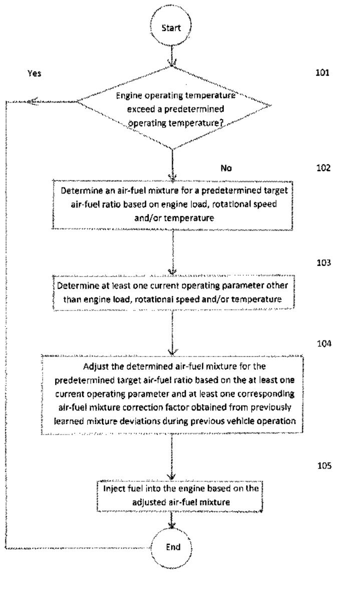

(51) Int. Cl.
*F02D 41/30* (2006.01)
*F02D 41/24* (2006.01)
*F02D 41/02* (2006.01)

(52) U.S. Cl.
CPC ..... *F02D 41/2445* (2013.01); *F02D 41/2454* (2013.01); *F02D 41/3005* (2013.01); *F02D 41/024* (2013.01); *F02D 41/1405* (2013.01); *F02D 2041/141* (2013.01)

(58) Field of Classification Search
USPC ......... 701/103–105, 114; 123/434, 436, 676, 123/681, 687
See application file for complete search history.

(56) References Cited

U.S. PATENT DOCUMENTS

| | | | | |
|---|---|---|---|---|
| 6,006,717 | A | 12/1999 | Suzuki et al. | |
| 6,513,485 | B2 | 2/2003 | Ogawa et al. | |
| 2012/0109500 | A1* | 5/2012 | Beer | F02D 41/068<br>701/103 |
| 2014/0041367 | A1* | 2/2014 | Balthes | F01N 3/035<br>60/274 |
| 2016/0237929 | A1* | 8/2016 | Eser | F02D 41/2474 |

FOREIGN PATENT DOCUMENTS

| | | | |
|---|---|---|---|
| DE | 103 38 058 | A1 | 12/2004 |
| DE | 698 25 682 | T2 | 1/2005 |
| DE | 10 2008 012 607 | A1 | 9/2009 |

* cited by examiner

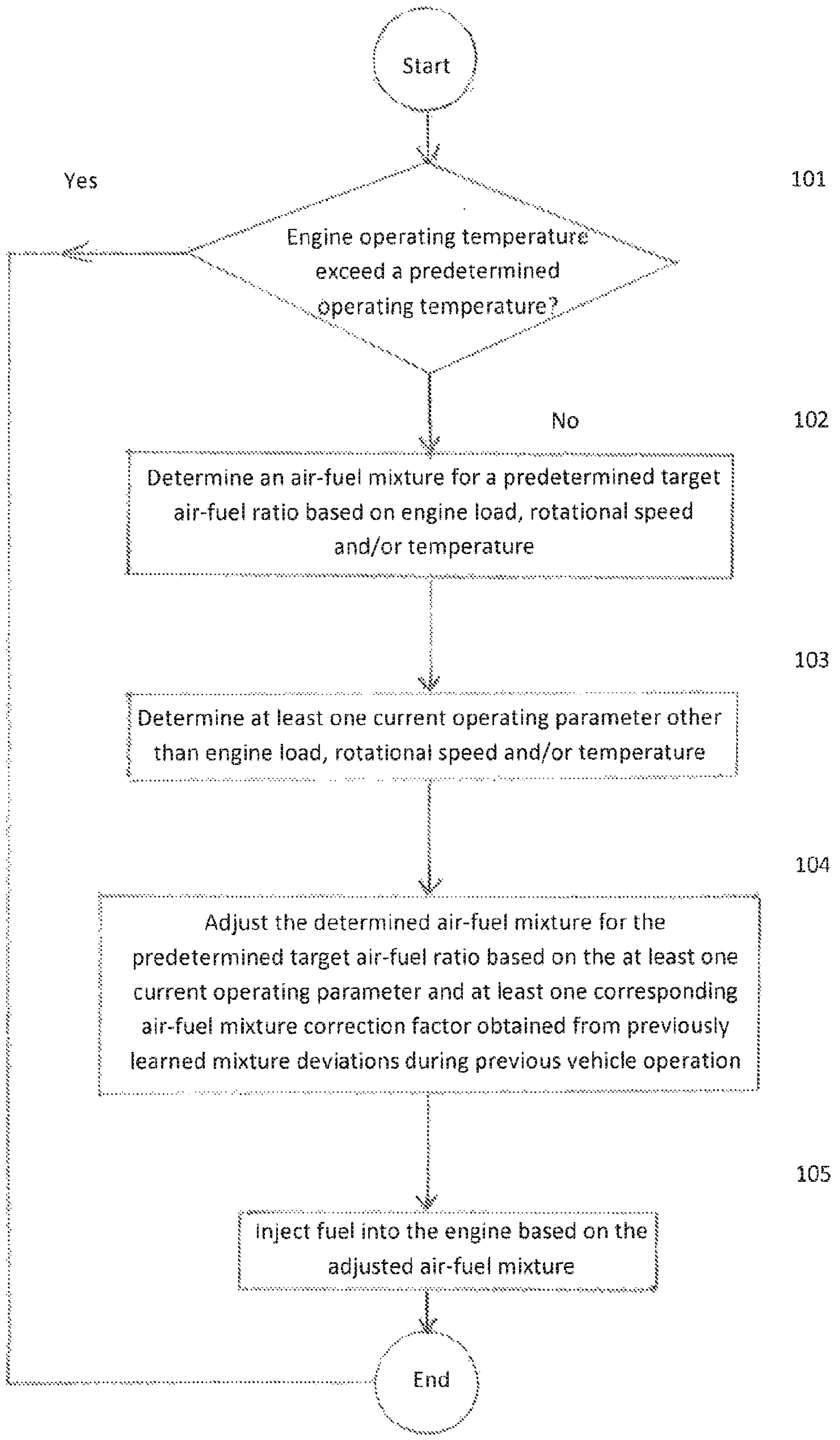
Start
Yes
101
Engine operating temperature exceed a predetermined operating temperature?
No
102
Determine an air-fuel mixture for a predetermined target air-fuel ratio based on engine load, rotational speed and/or temperature
103
Determine at least one current operating parameter other than engine load, rotational speed and/or temperature
104
Adjust the determined air-fuel mixture for the predetermined target air-fuel ratio based on the at least one current operating parameter and at least one corresponding air-fuel mixture correction factor obtained from previously learned mixture deviations during previous vehicle operation
105
Inject fuel into the engine based on the adjusted air-fuel mixture
End

METHOD FOR OPERATING AN INTERNAL COMBUSTION ENGINE

CROSS REFERENCE TO RELATED APPLICATION

This application claims priority under 35 U.S.C. §119 from German Patent Application No. 10 2014 202 002.6, filed Feb. 4, 2014, the entire disclosure of which is herein expressly incorporated by reference.

BACKGROUND AND SUMMARY OF THE INVENTION

The invention relates to a method for operating an internal combustion engine, in particular a gasoline engine, of a motor vehicle, comprising a mixture pilot control by which at least one composition of an air-fuel mixture required for a predetermined target air-fuel mixture ratio is determined.

It is principally already known to make a correction or adaption of the metering of the fuel mass and/or the air mass to be fed to the combustion chamber as part of a pilot control of the fuel mass and/or the air mass in order to be able to more precisely set a target air-fuel ratio. Such a mixture adaption or the determination of the corresponding correction factors in today's vehicles is carried out in dependence of load, rotational speed and engine temperature.

A method for determining operating-point-dependent correction values for the composition of the air-fuel ratio is already known from DE 103 38 058 A1. In an operating phase of the internal combustion engine, correction values for different temperatures of the internal combustion engine are determined and stored upon reaching a first temperature threshold until reaching a predetermined operating temperature of the internal combustion engine, said correction values serving for the mixture pilot control and/or for the adaption. The correction values determined in this way are additionally linked with individual operating conditions or operating ranges of the engine so that correction values associated with the current operating point can be used for the mixture pilot control.

It is an object of the invention to provide a method that is improved with respect to the accuracy of the mixture adaption and the mixture pilot control. The method according to the invention and its advantageous configurations can be implemented by an implemented algorithm or a corresponding assembly arrangement in at least one control device provided for this purpose, in particular in an engine control device.

The underlying basis of the invention is a known method for operating an internal combustion engine, in particular a gasoline engine, of a motor vehicle, comprising a mixture pilot control and a lambda control, wherein at least one composition of an air-fuel mixture required for a predetermined target air-fuel ratio is determined by the mixture pilot control, and operating-parameter-dependent correction factors for the composition of the air-fuel mixture determined by the mixture pilot control are determined from the deviation of the current actual air-fuel ratio from the predetermined target air-fuel ratio (corresponding to step 102 of FIG. 1). The determined correction factors are then taken into account for the composition of the air-fuel mixture to be determined by the mixture pilot control.

According to the prior art, only correction factors that depend on load and/or rotational speed and/or engine temperature are determined heretofore, i.e., when determining the composition of the air-fuel mixture, a correction factor determined for these operating parameter values is taken into account depending on the current load, the rotational speed and the engine temperature.

The invention is based on the knowledge that the at present conventional correction of the mixture pilot control by the operating-parameter-dependent correction factors, which depend only on the load, the rotational speed and the engine temperature, are too inaccurate so that with the mixture pilot control alone, the predetermined air-fuel ratio can be adjusted only very roughly in operating situations in which the lambda control is not ready for use (yet). From the time, the lambda control is actually ready for use, a significant (re)adjustment of the lambda value (air-fuel ratio) is therefore still necessary.

BRIEF DESCRIPTION OF THE DRAWING

FIG. 1 is a flow chart of method acts in accordance with an embodiment of the present invention.

DETAILED DESCRIPTION

In order to now be able to already achieve a more precise adjustment of the mixture pilot control by appropriate mixture adaption even before the onset of the lambda control, FIG. 1 illustrates an embodiment of the method according to the invention that provides that before the onset of the lambda control (step 101) during the mixture pilot control, the composition of the air-fuel mixture is additionally determined in dependence on further operating parameters of the vehicle, in particular of the internal combustion engine. In other words, not only load, rotational speed and engine temperature are evaluated and taken into account when determining the composition, but also further evaluable operating parameters.

Advantageously, for at least one further operating parameter or a further operating parameter combination of the vehicle (step 103), in particular of the internal combustion engine, a further operating-parameter-dependent correction factor is determined for this purpose for the composition of the air-fuel mixture to be determined by the mixture pilot control (step 104), which correction factor is taken into account during the mixture pilot control. Thus, additional mixture correction factors are defined which are learned from mixture deviations occurring during certain operating conditions of the vehicle and are included in the calculation (step 105). Thus, it is also possible that different engine operating modes are considered for the mixture adaption, for example.

Advantageously, a further operating-parameter-dependent correction factor can be determined in dependence on the injection strategy, in particular in dependence on whether a single injection or multiple injections of fuel into the cylinder are carried out. Accordingly, under otherwise identical operating conditions (load, rotational speed, engine temperature), different or additional correction factors for single injection or multiple injections can also be learned and provided for the mixture adaption.

Alternatively or additionally, a further operating-parameter-dependent correction factor can be determined depending on whether a throttled engine operation or unthrottled engine operation is carried out. Thus, different or additional correction factors would also be learned for the case of the throttled operation or the unthrottled engine operation.

Alternatively or additionally, a further operating-parameter-dependent correction factor can be determined for the mixture pilot control in dependence on the operating state of an exhaust catalyst, in particular in dependence on whether or not the exhaust catalyst is in heating mode.

Also possible is a determination of a further operating-parameter-dependent correction factor in dependence on the intake air temperature, in particular in dependence on whether or not the intake air temperature exceeds a defined threshold value and/or in dependence on the current transmission operation, in particular in dependence on whether the transmission is shifted into a drive position or is in neutral.

Depending on the configuration of the refinement according to the invention, it is possible to determine separate correction factors for each of the mentioned operating parameters, or to determine corresponding correction parameters for a particular combination of operating parameters.

In order to be able to ensure a comfortable transition in the case of a change to a new correction factor (e.g., when changing from neutral into a gear), it is provided in the case of a change of the operating point or the operating parameters which require a change of the operating-parameter-dependent correction factor from the initial correction factor to a new correction factor, that the change of the operating-parameter-dependent correction factor from the initial correction factor to the new correction factor is optionally carried out by a limiting gradient. Thereby, otherwise occurring steps in the mixture composition can be avoided.

Different models can be used for determining the operating-parameter-dependent correction factors. However, these operating-parameter-dependent correction factors are optimally determined by a neuronal correction encoder. The neuronal correction encoder receives the relevant operating parameters of the motor vehicle, control input variables and correcting variables of the superordinated lambda controller or lambda unit, and based on these input variables, it generates corresponding correction factors for the air-fuel mixture determined by the mixture pilot control in order to effect an adaption of the parameters which influence the neuronal correction encoder in terms of the mode of action thereof.

By means of the method illustrated here, the mixture pilot control can already be carried out very precisely in a simple and cost-effective manner before the onset of the lambda control so that the lambda control is significantly relieved when it is subsequently ready for use. Furthermore, substantial improvements in terms of road performance and emission performance are achieved with said method.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for operating an internal combustion engine of a motor vehicle having a mixture pilot control which determines at least one composition of an air-fuel mixture required for a predetermined target air-fuel mixture ratio and a lambda control with at least one lambda probe arranged in the exhaust gas flow of the internal combustion engine, comprising the acts of:

determining the at least one composition of the air-fuel mixture required for the predetermined target air-fuel mixture ratio by the mixture pilot control;

determining from at least one of a load on, a rotational speed of, and a temperature of, the internal combustion engine a first operating-parameter-dependent correction factor for the at least one composition of the air-fuel mixture determined by the mixture pilot control;

determining from a vehicle operating parameter other than the load on, the rotational speed of, or the temperature of, the internal combustion engine a second operating-parameter-dependent correction factor for the at least one composition of the air-fuel mixture determined by the mixture pilot control;

determining a corrected air-fuel mixture by adjusting the at least one composition of the air-fuel mixture required for the predetermined target air-fuel mixture ratio by the mixture pilot control by the first and second operating-parameter-dependent correction factors; and controlling a fuel injection quantity by the mixture pilot control in accordance with the corrected air-fuel mixture.

2. The method according to claim 1, further comprising the act of:

determining from a further vehicle operating parameter other than the load on, the rotational speed of, or the temperature of, the internal combustion engine at least one further operating-parameter-dependent correction factor, wherein the further operating-parameter-dependent correction factor is taken into account in the determining of the corrected air-fuel mixture.

3. The method according to claim 2, wherein the further operating-parameter-dependent correction factor is determined in dependence on whether a fuel injection strategy is a single injection or multiple injections of fuel into a cylinder of the internal combustion engine during a combustion cycle conducted in the cylinder.

4. The method according to claim 2, wherein the further operating-parameter-dependent correction factor is determined in dependence on whether the internal combustion engine is operated in a throttled state or an unthrottled state.

5. The method according to claim 2, wherein the further operating-parameter-dependent correction factor is determined in dependence on whether an exhaust catalyst is in heating mode.

6. The method according to claim 2, wherein the further operating-parameter-dependent correction factor is determined in dependence on whether an intake temperature exceeds a predefined threshold value.

7. The method according to claim 2, wherein the further operating-parameter-dependent correction factor is determined in dependence on whether a transmission of the vehicle is in a drive position or in neutral.

8. The method according to claim 1, wherein when a change occurs in one of said operating-parameter-dependent correction factors changes from a previously-determined value, in the act of determining the corrected air-fuel mixture the change to a new value of the one of said operating-parameter-dependent correction factors is implemented in accordance with a limiting gradient which limits a rate of change from the previously-determined value to the new value.

9. The method according to claim 1, wherein said operating-parameter-dependent correction factors are determined by a neuronal correction encoder.

* * * * *